(12) United States Patent
Manian et al.

(10) Patent No.: US 7,114,000 B1
(45) Date of Patent: Sep. 26, 2006

(54) SCHEDULING NETWORK TRAFFIC USING MULTIPLE LOGICAL SCHEDULE TABLES

(75) Inventors: Radesh Manian, San Jose, CA (US); Shirish K. Sathe, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/451,196

(22) Filed: Nov. 29, 1999

(51) Int. Cl.
*G06F 15/16* (2006.01)
*G06F 11/00* (2006.01)

(52) U.S. Cl. .............. 709/232; 709/230; 709/231; 709/233; 709/234; 709/238; 370/229; 370/230; 370/231; 370/236; 370/395; 370/398; 710/61

(58) Field of Classification Search ............... 709/229, 709/230, 232–238; 370/229–230, 395, 398
See application file for complete search history.

(56) References Cited

U.S. PATENT DOCUMENTS

| | | | | |
|---|---|---|---|---|
| 5,889,763 A | * | 3/1999 | Boland et al. | 370/235 |
| 5,982,749 A | * | 11/1999 | Daniel et al. | 370/395.21 |
| 6,005,866 A | * | 12/1999 | Lincoln | 370/398 |
| 6,137,779 A | * | 10/2000 | Miller et al. | 370/236 |
| 6,272,109 B1 | * | 8/2001 | Pei et al. | 370/230 |
| 6,285,657 B1 | * | 9/2001 | Lewis et al. | 370/230 |
| 6,359,891 B1 | * | 3/2002 | Bergantino et al. | 370/398 |
| 6,377,579 B1 | * | 4/2002 | Ofek | 370/395.4 |
| 6,389,019 B1 | * | 5/2002 | Fan et al. | 370/233 |
| 6,396,834 B1 | * | 5/2002 | Bonomi et al. | 370/394 |
| 6,430,187 B1 | * | 8/2002 | Park | 370/397 |
| 6,477,144 B1 | * | 11/2002 | Morris et al. | 370/230.1 |

OTHER PUBLICATIONS

*Network Access Products: Bt8233 ATM ServiceSAR with xBR Traffic Management.* Rockwell Semiconductor Systems. pp. 1-139. http://www.conexant.com/techinfo/data_sheets/atm/sar/8223/18233-.

* cited by examiner

*Primary Examiner*—Syed A. Zia
(74) *Attorney, Agent, or Firm*—Blakely, Sokoloff, Taylor & Zafman LLP

(57) ABSTRACT

A method and apparatus are described for scheduling traffic in a network. The method comprises (a) dividing a hardware schedule table into N logical schedule tables which are separated by table delimiters; and (b) assigning an identifier corresponding to a connection in the network in a scheduling table which is one of the N logical schedule tables.

31 Claims, 9 Drawing Sheets

SCHEDULING NETWORK TRAFFIC USING MULTIPLE LOGICAL SCHEDULE TABLES

FIELD OF THE INVENTION

This invention relates to computer networks. In particular, the invention relates to traffic scheduling.

THE BACKGROUND OF THE INVENTION

Technologies for computer networks have advanced at a fast rate to accommodate the needs for efficient and reliable communication. Designs for computer networks are now becoming complex both in hardware and software. To reduce complexity, most computer networks are organized as a series of layers or protocols, each one built upon the one below it. The function of each layer is to provide certain services to the higher layers, shielding those layers from the specific and detailed implementation of these services.

A network architecture typically follows some reference model to maintain universality and standardization. Examples of important reference models include the broadband Integrated Services Digital Network (B-ISDN) Asynchronous Transfer Mode (ATM), the Open System Interconnection (OSI), and the Transmission Control Protocol/Internet Protocol (TCP/IP) reference models. In general, a network architecture has the following layers: application, transport, network, data link, and physical. In these layers, the actual data transmission takes place in the physical layer.

An ATM wide area network (WAN) typically consists of multiple ATM interfaces. In the outbound direction, the network traffic shaping is performed on a per virtual connection basis. Each ATM interface supports multiple classes of service (COSes), each having its own unique shaping requirements. A typical network system supports multiple ATM interfaces with speeds ranging from 1.5 Magabits per second (Mbps) (e.g., T1) to 155 Mbps (e.g., OC-3).

To support a single ATM interface, many ATM segmentation and reassembly (SAR) processors are commercially available. These SAR processors typically have a fixed number of hardware schedule tables (HSTs) that are used for traffic shaping according to some scheduling algorithm. These HSTs can support a number of COSes.

When the system configuration has service requirements that exceed the number of COSes supported by the HSTs, a single SAR processor cannot be used. Multiple SAR processors can be used to satisfy the service requirements. However, this increases hardware complexity and creates a burden to the system management.

SUMMARY OF THE INVENTION

A method and apparatus are described for scheduling traffic in a network.

The method comprises (a) dividing a hardware schedule table into N logical schedule tables which are separated by table delimiters; and (b) assigning an identifier corresponding to a connection in the network in a scheduling table which is one of the N logical schedule tables.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

A method and apparatus are described for scheduling traffic in a network. A hardware schedule table is divided into N logical schedule tables separated by table delimiters. An identifier corresponding to a connection request is assigned to one of the N logical schedule tables.

In the following description, the description refers to the ATM model and the network segmentation and reassembly processor is merely an interface example. It is contemplated that the technique is applicable to other models, buses, or network architectures with similar characteristics.

ATM technology provides a high level of services to data communication. The basic idea of ATM is to transmit information in small, fixed-size packets called cells. The cells are 53 bytes long, of which 5 bytes are header and 48 bytes are payload. The advantages of using cell-switching technology in ATM includes flexibility in accommodating both constant and variable rate traffic, high speeds of data transfers, and broadcasting ability.

An ATM network architecture includes a physical layer, an ATM layer, and an ATM adaptation layer. The physical layer deals with the physical medium. The ATM layer deals with cells and cell transport, including congestion control. The ATM adaptation layer provides segmentation and re-assembly (SAR) of packets of cells. The UTOPIA is an interface between an upper ATM layer module and a physical layer module. To manage the network traffic, a SAR processor is used to perform segmentation and reassembly of packets of cells. In addition, many SAR processors also have schedules to schedule connections at specified time slots for traffic shaping.

Figure 1:
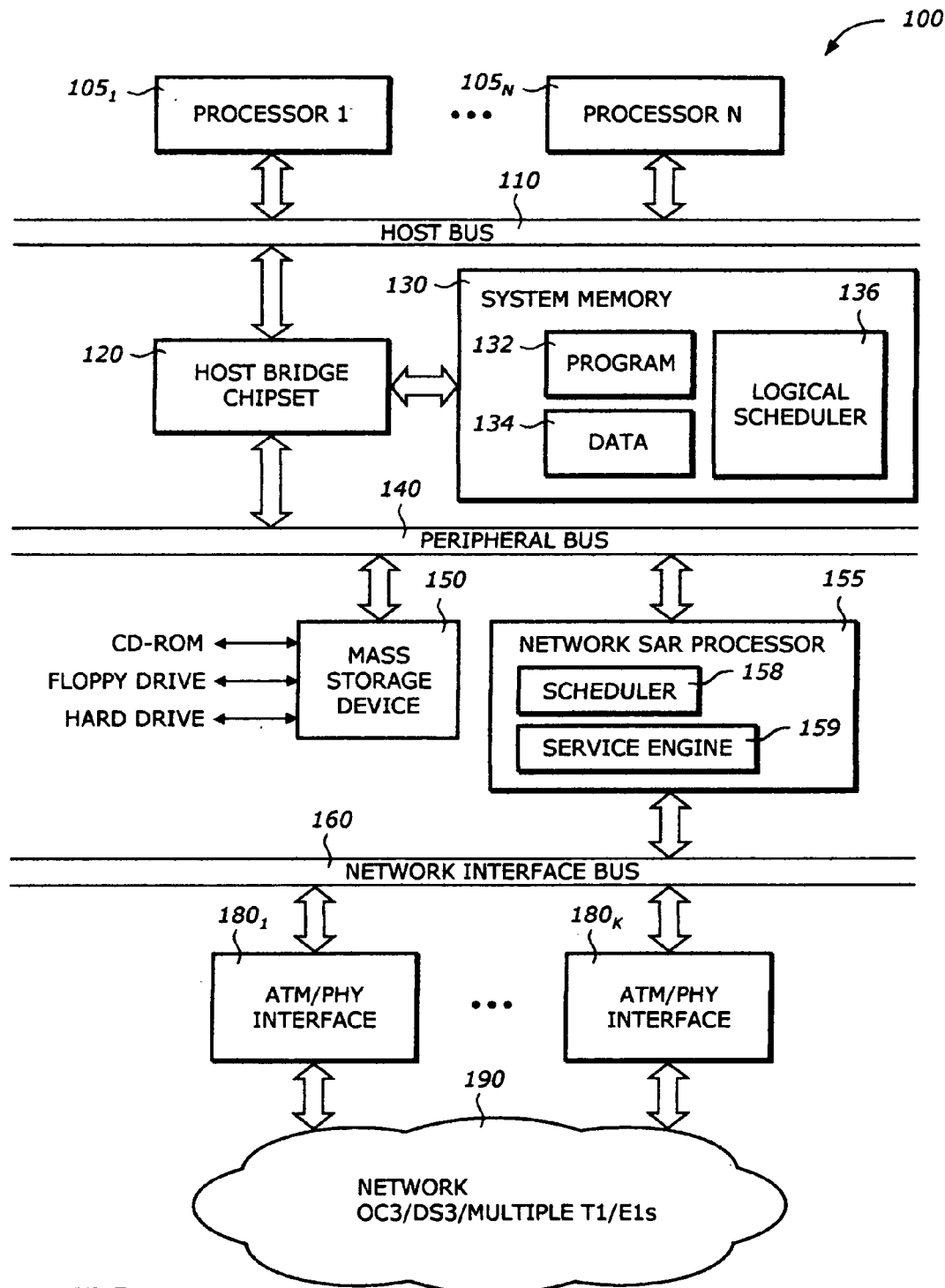
FIG. 1 shows a system in which one embodiment of the invention can be practiced.

FIG. 1 is a diagram illustrating a computer system 100 in which one embodiment of the invention can be practiced. The computer system 100 include N processors $105_1$ to $105_N$, a host bus 110, a host bridge chipset 120, a system memory 130, a peripheral bus 140, a mass storage device 150, a network segmentation and reassembly (SAR) processor 155, a network interface bus 160, and K network interface processors $180_1$ to $180_K$.

Each of the N processors $105_1$ to $105_N$ represents a central processing unit of any type of architecture, such as complex instruction set computers (CISC), reduced instruction set computers (RISC), very long instruction word (VLIW), explicitly parallel instruction set computing (EPIC), or hybrid architecture. Various embodiments of the invention could be implemented on a multi-processor or single processor computer system.

The host bridge chipset 120 includes a number of interface circuits to allow each of the N processors $105_1$ to $105_N$ access to the system memory 130 and the peripheral bus 140. The system memory 130 represents one or more mechanisms for storing information. For example, the system memory 130 may include non-volatile or volatile memories. Examples of these memories include flash memory, read only memory (ROM), or random access memory (RAM). The system memory 130 includes program 132, data 134, and a logical scheduler 136. Of course, the system memory 130 preferably contains additional software (not shown), which is not necessary to understanding the invention. The logical scheduler 136 includes program, code, and data to perform the scheduling to shape the traffic for the network 190. The logical scheduler 136 mainly controls the network SAR processor 155. The logical scheduler 136 may also reside in a local memory accessible to the network SAR processor 155. The co-processor on the network SAR processor 155 may also execute the code corresponding to the logical schedule 136.

The peripheral bus 140 is a bus that allows each of the N processors $105_1$ to $105_N$ communicate with the peripheral devices coupled to the peripheral bus 140. Examples of the peripheral bus include the peripheral components interconnect (PCI). The mass storage device 150 includes CD ROM, floppy diskettes, and hard drives. The SAR processor 155 receives and transmits messages to the network 190. The SAR processor 155 includes a scheduler 158. The scheduler 158 performs scheduling to shape traffic on the network and includes a number of hardware schedule tables (HSTs). The network SAR processor 155 interfaces to the network interface processors $180_1$ to $180_K$ via a network interface bus 160 such as the UTOPIA.

The scheduler 158 is typically part of a traffic management unit in the SAR processor 155. The traffic management unit provides traffic shaping for several service categories. Examples of these service categories include constant bit rate (CBR), variable bit rate (VBR), unspecified bit rate (UBR), and available bit rate (ABR). The categories may also include real-time (RT) or non real-time (NRT) support. The scheduler 158 schedules traffic by assigning connection identifiers from virtual circuit channels (VCCs) in HSTs, or scoreboards. The scheduler 158 sequences through the HSTs in a circular fashion to schedule the specified (e.g., CBR, VBR, ABR) traffic. When a connection identifier is assigned to an occupied entry in a HST, the scheduler 158 finds the next available entry in the HST, including wrapping around to the beginning of the HST, and assigns the connection identifier in the next available entry.

The logical scheduler 136 controls the scheduler 158 by creating a set of logical schedule tables (LSTs) from the HSTs to increase the support scope of the scheduler 158 when necessary such as when the number of service requests exceeds the available HSTs.

Each of the network interface processors $180_1$ to $180_K$ is a device to provides interface to a network 190. The network 190 is connected to several communication ports to support various communication protocols and speeds such as OC3, DS3, and multiple T1/E1 ports.

When implemented in software, the elements an embodiment of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2:
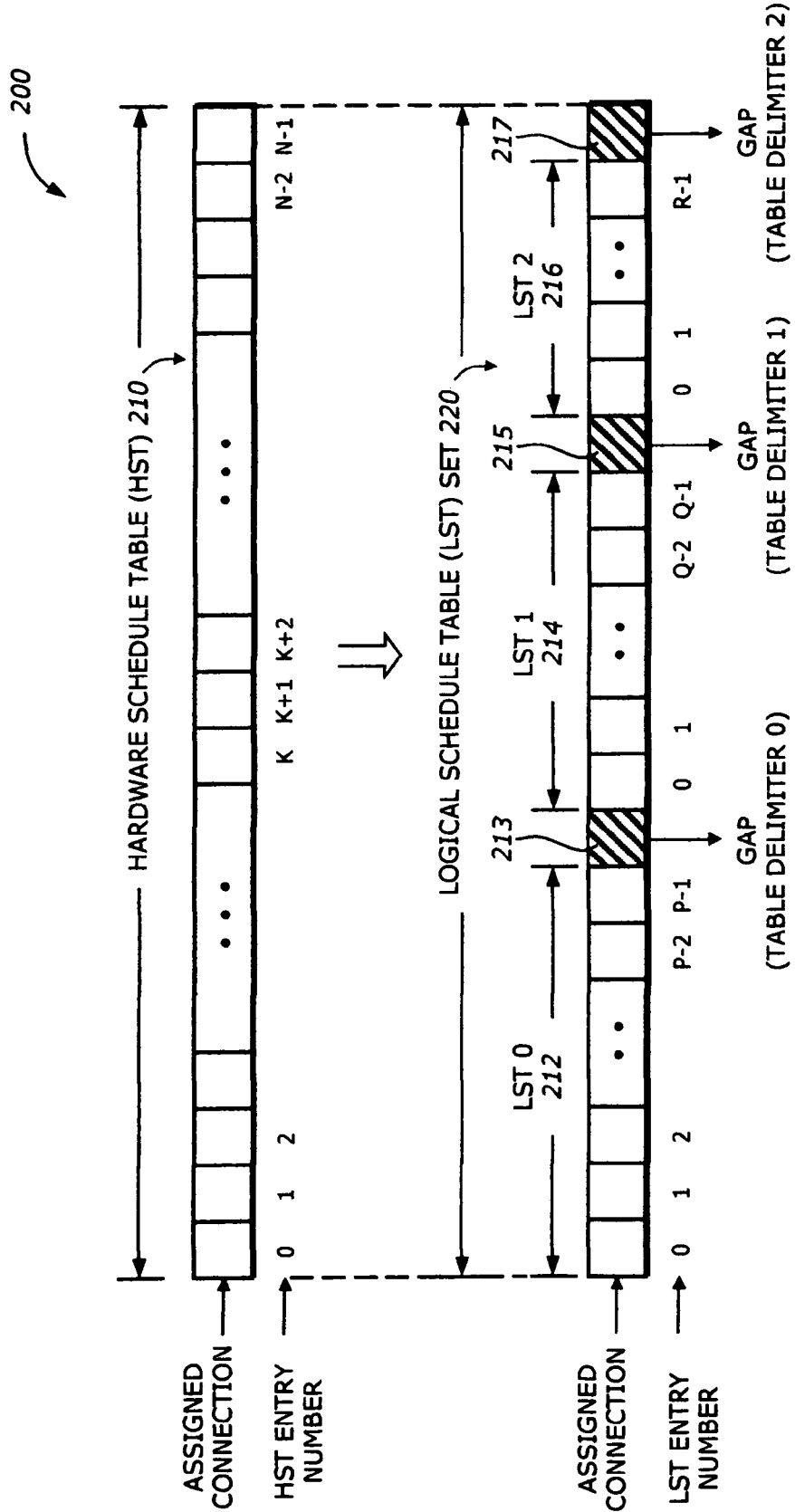
FIG. 2 shows a conversion of a hardware schedule table into a set of logical schedule tables.

FIG. 2 shows a conversion 200 of a hardware schedule table into a set of logical schedule tables. The conversion 200 converts a hardware schedule table (HST) 210 into a logical schedule table (LST) set 220.

The HST 210 typically a part of the scheduler 158 in FIG. 1. The HST 210 includes N entries for the assigned connection identifiers. The N entries are numbered 0, 1, . . . N–2, N–1.

The LST set 220 includes three LSTs: LST0 212, LST1 214, and LST2 216. As is known by one skilled in the art, the number of LSTs can be any number as required by the system configuration. The three LSTs 212, 214, and 216 are separated by three table delimiters 213, 215, and 217. A table delimiter is used to separate two adjacent LSTs and is typically an unused entry. Each table delimiter corresponds to a LST. For example, the delimiters 213, 215, and 217 correspond to the LST0 212, LST1 214, and LST2 216, respectively. The LST0 212 has P entries numbered from 0 to P–1. The LST1 214 has Q entries numbered from 0 to Q–1. The LST2 has R entries numbered from 0 to R–1. The LSTs in the LST set 220 operate independently of one another.

Let S be the total number of LSTs in the LST set 220. Let $P_i$ be the size of the $LST_i$ in the LST set 220 where i= 0, . . . , S–1. Let N be the size of the HST 210. Each LST has a table delimiter. Typically, the table delimiter corresponds to an unused entry. The size of the table delimiter may be more than one entry if necessary. When the size of the table delimiter is one entry, the following expression holds:

$$N = S + \Sigma P_i \quad i=0, \ldots, S-1 \qquad (1)$$

In one embodiment, when N and S are powers of 2, the $P_i$'s are the same and are determined as:

$$P_i = (N/S) - 1 \qquad (2)$$

For example, when N=2048 and S=4, then each LST has $P_i$=255 entries. The use of power-of-2 sizes facilitates the assignment of the connection identifiers in the schedule table.

Figure 3A:
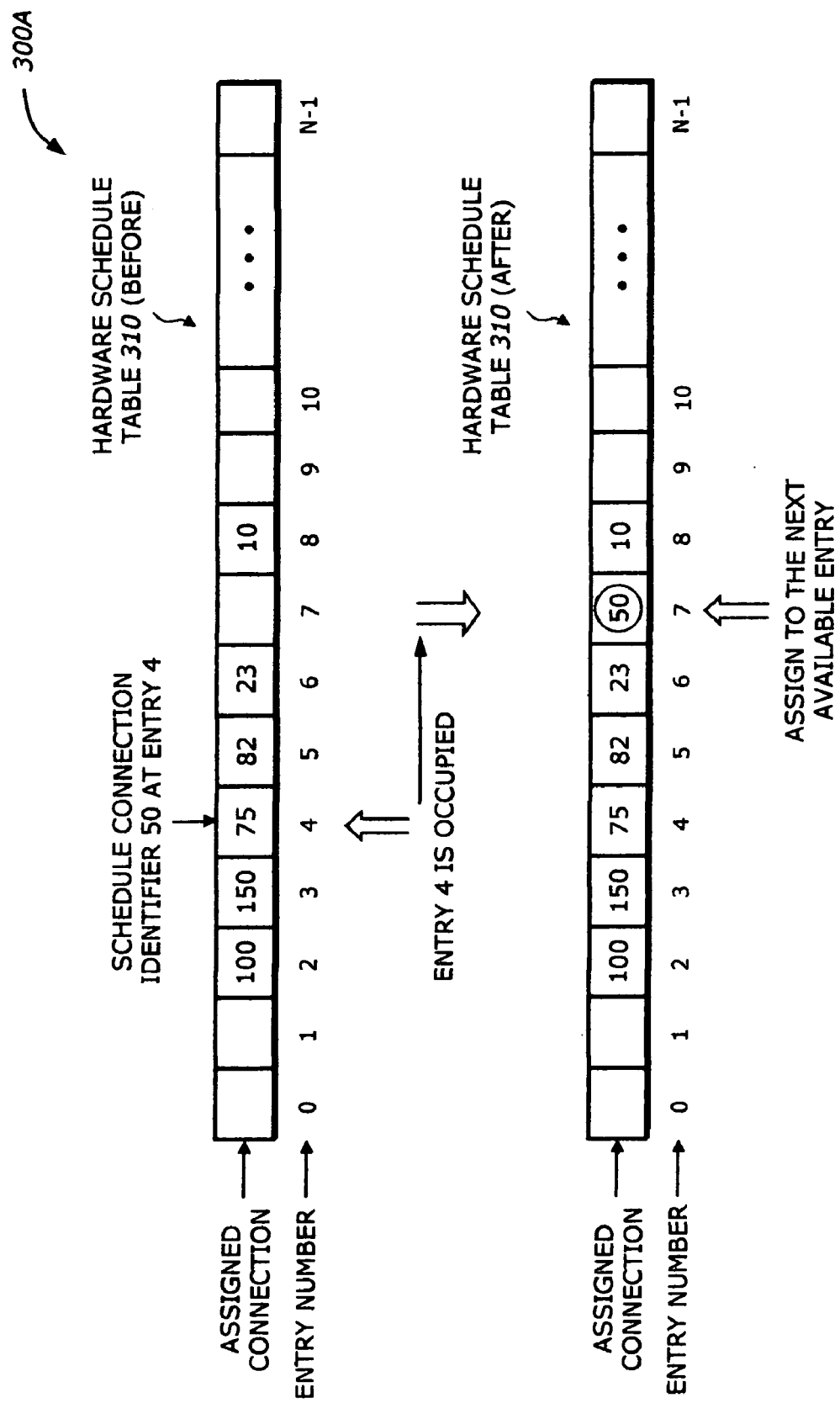
FIG. 3A shows an example of an assignment of a connection identifier in an entry of a schedule table.

FIG. 3A shows an example of assignment 300A of a connection identifier in an entry of a schedule table. The assignment 300A shows a schedule table 310 before and after the assignment.

The schedule table can be either HST or LST. In this example, the schedule table 310 has N entries. Entry numbers 2, 3, 4, 5, 6, 8 are occupied and have been assigned the connection identifiers 100, 150, 75, 82, 23, and 10, respectively. Suppose connection identifier 50 is scheduled at entry or slot number 4 according to some traffic scheduling algorithm. However, entry number 4 has been occupied by the connection identifier 75. Therefore, the connection identifier 50 has to be assigned to another entry.

Since scheduling is time sensitive, it is desirable to assign the requested connection as close as possible to the originally assigned entry. The simplest method is to assign the connection identifier in the next available entry starting from the originally assigned entry going toward the end of the schedule table. In the example shown in FIG. 3A, the next available entry is at entry number 7. Therefore, the connection identifier 50 is assigned to entry number 7.

Figure 3B:
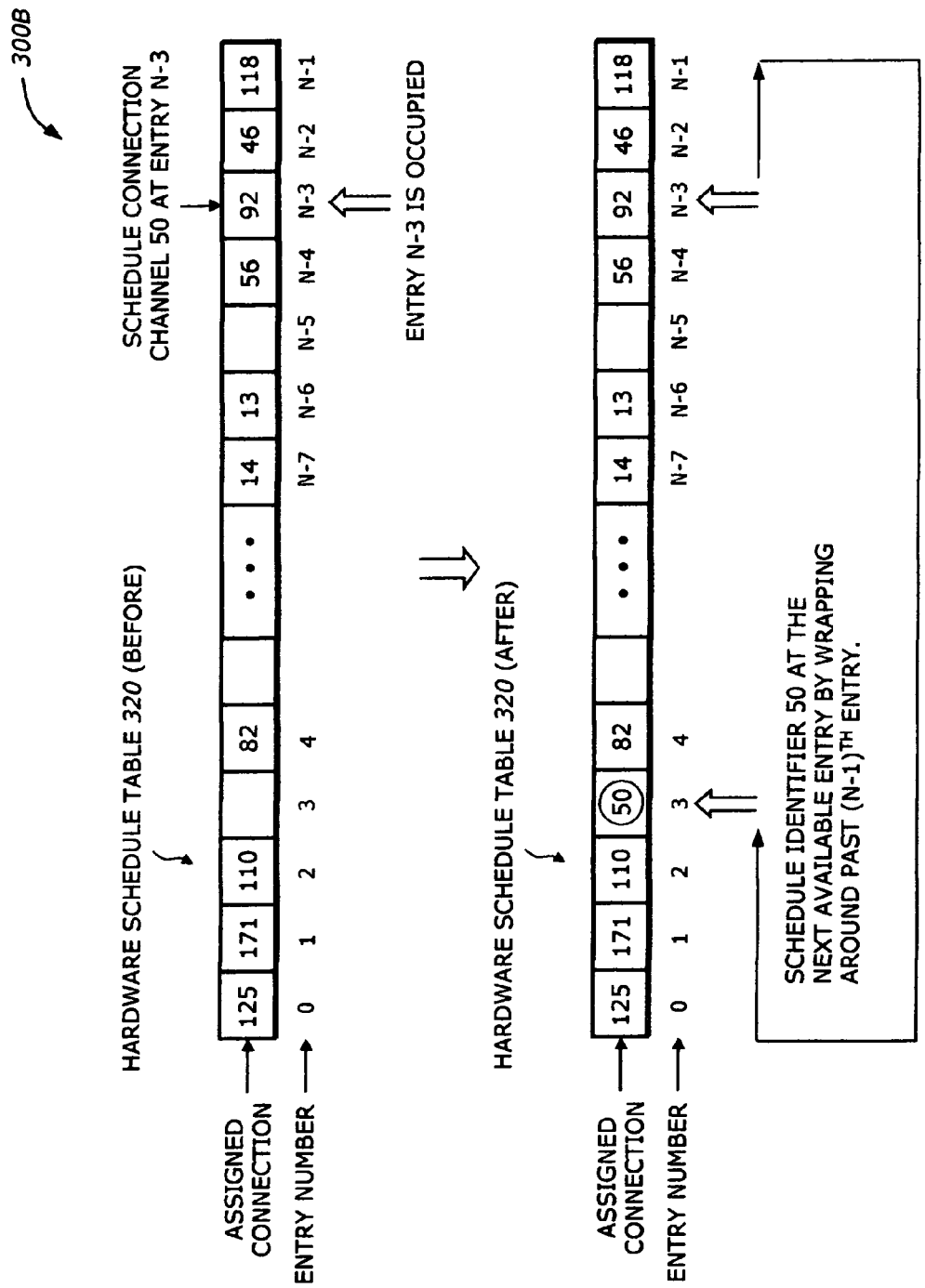
FIG. 3B shows an example of an assignment of a connection identifier in an entry of a schedule table by wrapping around the schedule table.

FIG. 3B shows an example of an assignment 300B of a connection identifier in an entry of a schedule table by wrapping around the schedule table. The assignment 300B shows a schedule table 320 before and after the assignment.

The schedule table can be either HST or LST. In this example, the schedule table 320 has N entries. Entry numbers 0, 1, 2, 4, N–7, N–6, N–4, N–3, N–2, and N–1 are occupied and have been assigned the connection identifiers 125, 171, 110, 82, 14, 13, 56, 92, 46, and 118, respectively. Suppose connection identifier 50 is scheduled at entry or slot number N–3 according to some traffic scheduling algorithm. However, entry number N–3 has been occupied by the connection identifier 92. Therefore, the connection identifier 50 has to be assigned to another entry.

The next available entry is found by going from the originally assigned entry number to the end of the schedule table and wrapping around to the beginning of the table and continuing to the rest of the table. In this example, the next available entry is entry number 3. Therefore the connection identifier 50 is assigned to entry number 3.

Figure 4:
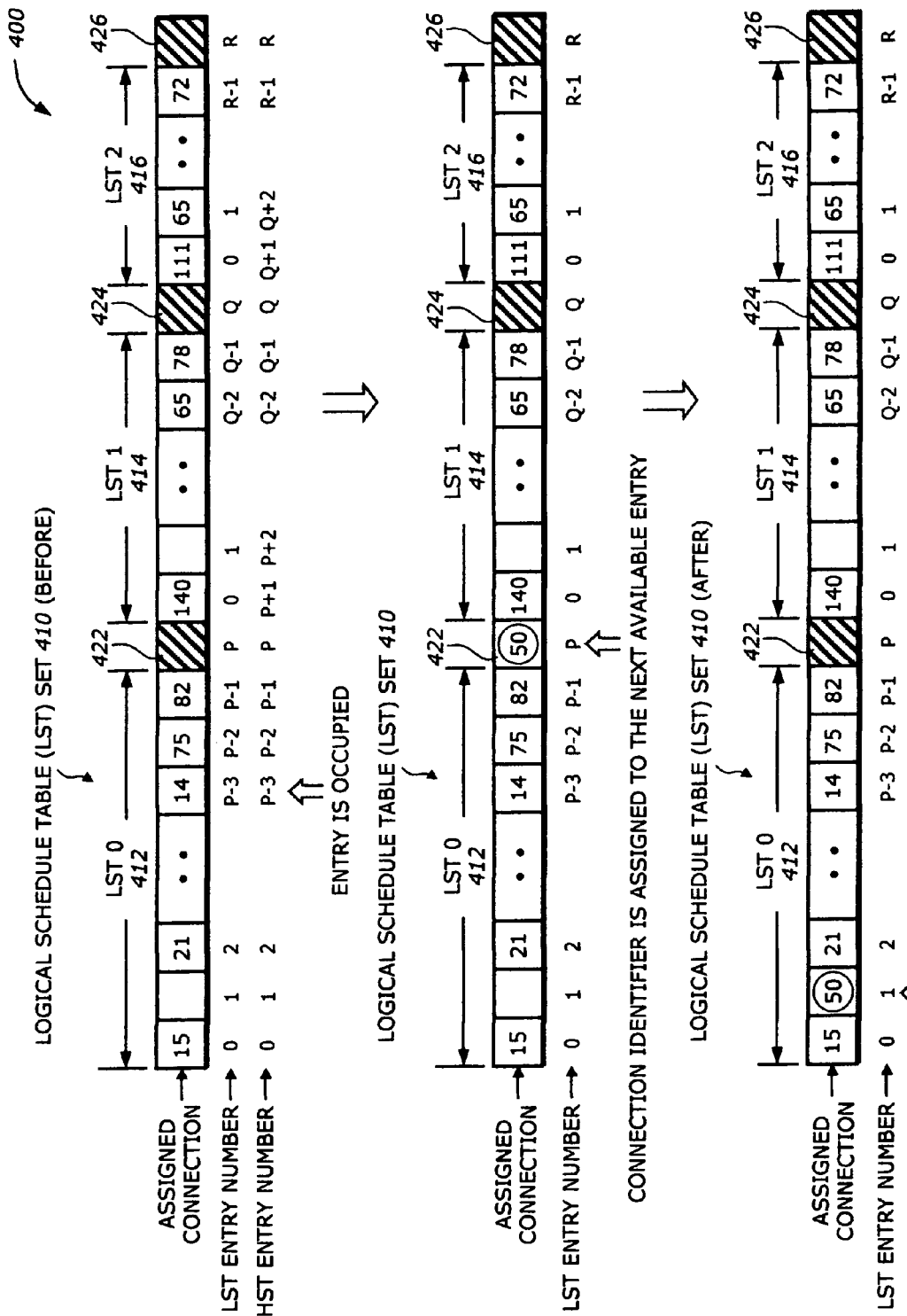
FIG. 4 shows an example of an assignment of a connection identifier in an entry of a logical schedule table set.

FIG. 4 shows an example of an assignment 400 of a connection identifier in an entry of a logical schedule table set. The assignment 400 shows a LST set 410 before and after the assignment.

The LST set 410 includes three LSTs: LST0 412, LST1 414, and LST2 416 having P, Q, and R entries, respectively. The LST0 412, LST1 414, and LST2 416 have table delimiters 422, 424, and 426 at entry numbers P, Q and R, respectively. The LSTs 412, 414, and 416 operate independently of one another. The assignment of a connection identifier in one LST is independently of that in another LST. In each LST, the assignment follows the same procedure as illustrated in FIGS. 3A and 3B.

In the example shown in FIG. 4, the connection identifier 50 is originally assigned to the entry number P–3 of the LST0 412 according to some traffic scheduling algorithm. The entry P–3 of the LST0 412, however, has been occupied by the connection identifier 14. Therefore the connection identifier 50 has to be assigned to another entry in the LST0 412.

The scheduler 158 (shown in FIG. 1) finds the next available entry in the HST containing the three LSTs 412, 414, and 416 and assigns the connection identifier in the found available entry. Then, the scheduler 158 returns the entry number of this available entry. The logical scheduler monitors this returned entry number to determine if this available entry is within the corresponding LST. If this available entry is within the corresponding LST, then the scheduling is complete. If this available entry is outside the corresponding LST, the logical scheduler 136 (shown in FIG. 1) re-assigns the connection identifier to an entry within the corresponding LST. Since each LST has a delimiter corresponding to an unused or available entry, there is always an available entry at the end of each LST. The scheduler 158, therefore, can never assign the connection identifier past the LST boundary into another LST territory. Knowing the locations of the table delimiters, the logical scheduler 136 can determine if the connection identifier needs to be re-assigned. If the connection identifier is assigned in the table delimiter of the current LST by the scheduler 158, the logical scheduler 136 re-assigns the connection identifier by requesting the scheduler 158 to schedule the connection at the beginning of the LST.

In the example shown in FIG. 4, the next available entry after the entry number P–3 is the delimiter 422 at entry number P. The scheduler 158 assigns the connection identifier 50 in entry number P and returns the entry number. The logical scheduler 136 monitors the returned entry number and recognizes that this entry number corresponds to the location of the delimiter 422 of the LST0 412. The logical scheduler 136 then removes the connection identifier 50 from the entry number P and finds another available entry in the LST0 412 starting from the beginning of the LST0 412 with the help of the hardware scheduler. In the example shown in FIG. 4, the entry number 1 is unoccupied and therefore the connection identifier is assigned in the entry number 1.

An advantage of this scheme is that the scheduling is performed by the scheduler 158 and is assisted by the logical scheduler 136 only when the assignment goes beyond the corresponding LST. In most cases, the scheduler 158 can find an available entry within the current LST. Since the scheduler 158 is typically a hardware co-processor within the SAR processor 155 (shown in FIG. 1), the processing speed of the scheduling is fast. The logical scheduler 136 only occasionally interferes with the scheduling when the next available entry coincides with the table delimiter of the current LST. The advantage of broadening the support scope of the scheduler by the LSTs far outweighs the minor performance slow processing time by the logical scheduler 136.

Figure 5A:
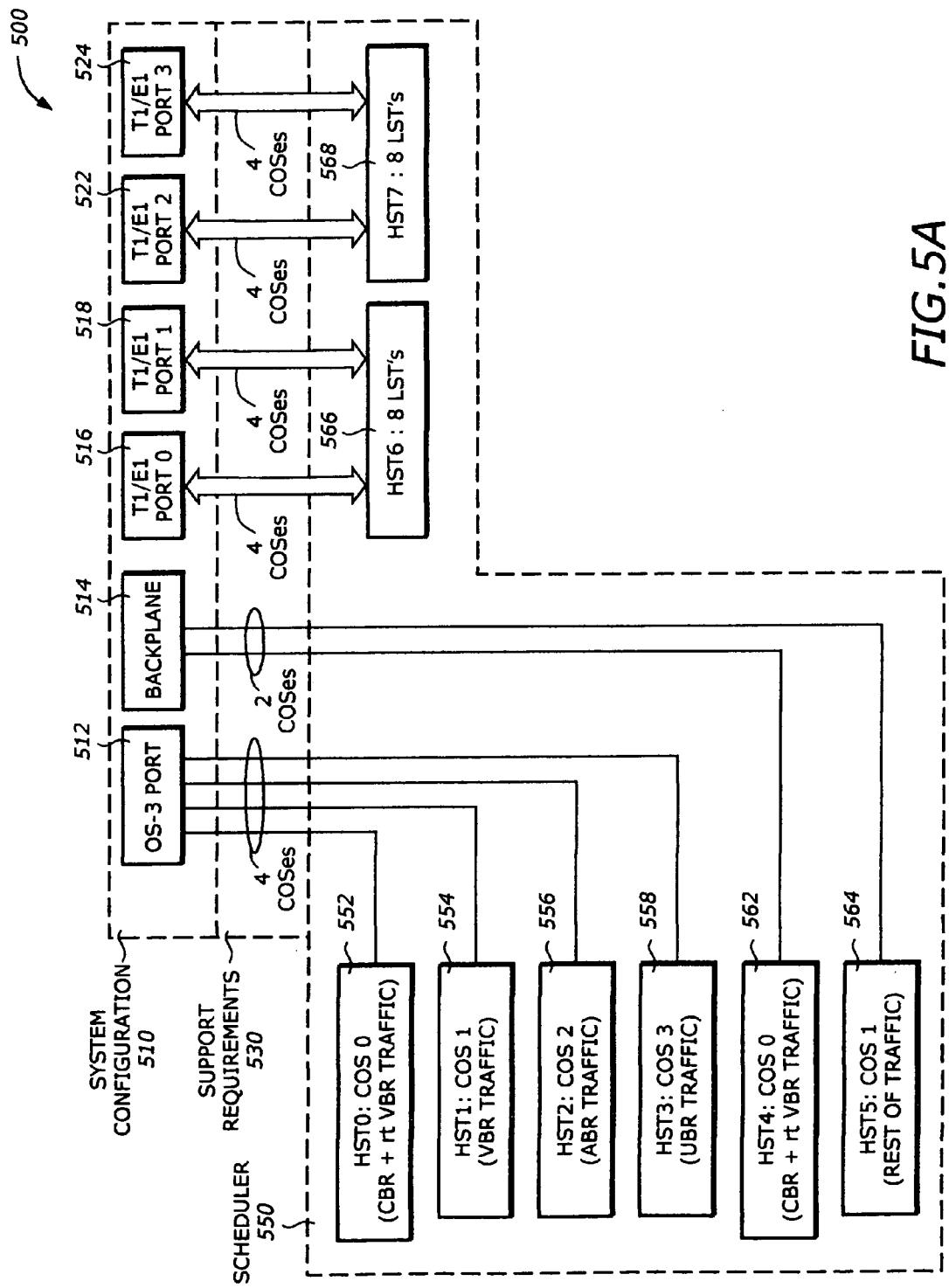
FIG. 5A shows an example of an assignment of schedule tables to a system configuration.

FIG. 5A shows an example of an assignment 500 of schedule tables to a system configuration. The assignment 500 assigns the HSTs in the scheduler 550 to a system configuration 510 according to the support requirement 530.

The system configuration 510 includes an OC-3 port 512, a backplane 514, four T1/E1 ports: port 0 516, port 1 518, port 2 522, and port 3 524. The support requirement 530 includes four classes of service (COSes) for the OC-3 port 512, two COSes for the backplane 514, and four COSes for each of the four T1/E1 ports 516, 518, 522, and 524. The scheduler 550 has eight HSTs: HST0 552, HST1 554, HST2 556, HST3 558, HST4 562, HST5 564, HST6 566 and HST7 568. Each of the HSTs has 2048 entries.

The total number of schedule tables needed for this system is 22 (4 for the OC-3 port 512, 2 for the backplane 514, and 16 for the four T1/E1 ports 516, 518, 522, and 524). Since there are only 8 HSTs in the scheduler 550, there is not enough HSTs to support the system configuration. Therefore, logical schedule tables are to be created.

In this example, the OC-3 port 512 and the backplane have high priority and it is desirable to fully support the services. Therefore, 6 HSTs in the scheduler 550 are used to support the OC-3 port 512 and the backplane. The remaining 2 HSTs are used to support the four T1/E1 ports 516, 518, 522, and 524 using logical schedule tables.

For the OC-3 port 512, the HST0 552, HST1 554, HST2 556, and HST3 558 support the COS0 (e.g., CBR and rt VBR traffic), COS1 (e.g., VBR traffic), COS2 (e.g., ABR traffic), and COS3 (e.g., UBR traffic), respectively. For the backplane, the HST4 and HST5 support the COS0 (e.g., CBR and rt VBR traffic) and COS1 (e.g., rest of traffic), respectively. The HST6 566 supports the T1/E1 port 0 516 and T1/E1 port 1 518. The HST7 568 supports the T1/E1 port 2 522 and T1/E1 port 3 524. To provide complete support for all four COSes, each of the HST6 566 and HST7 568 is divided into eight LSTs.

Figure 5B:
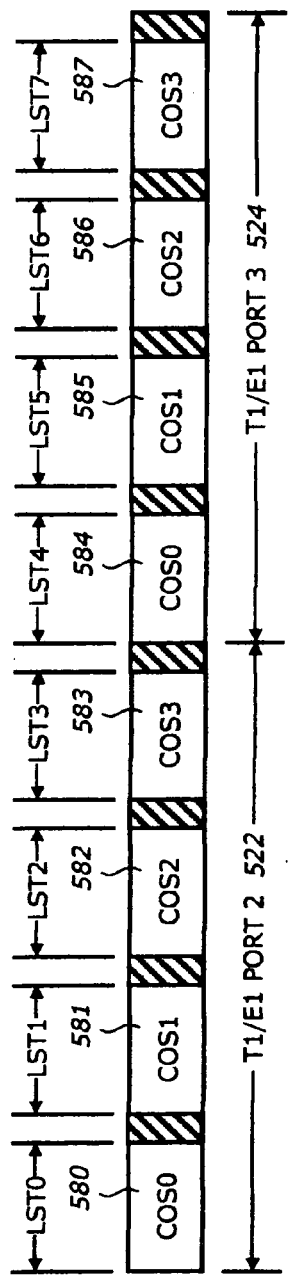
FIG. 5B shows an example of using logical schedule tables for the hardware schedule tables.
Figure 5B:
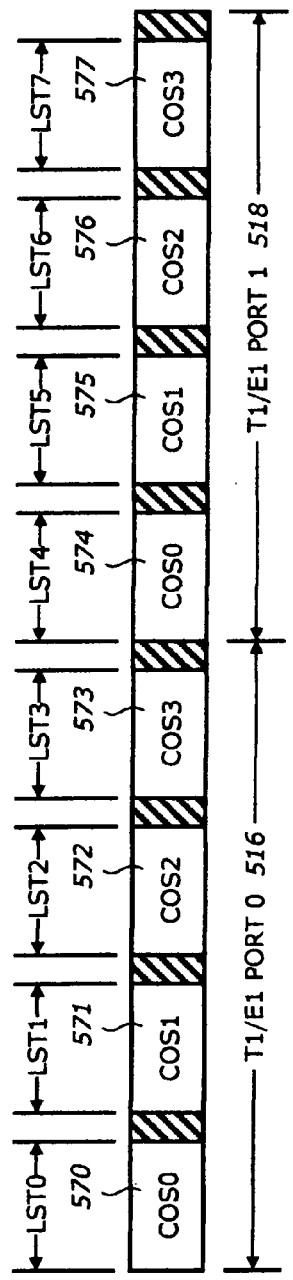

FIG. 5B shows an example of using logical schedule tables for the hardware schedule tables shown in FIG. 5A.

The HST6 566 is divided into eight LSTs having the same size: LST0 570, LST1 511, LST2 572, LST3 573, LST4 574, LST5 575, LST6 576, and LST7 577. The LST0 570, LST1 571, LST2 572, and LST3 573 support the T1/E1 port 0 516 for the COS0, COS1, COS2, and COS3, respectively. The LST4 574, LST5 575, LST6 576, and LST7 577 support the T1/E1 port 1 518 for the COS0, COS1, COS2, and COS3, respectively.

The HST6 568 is divided into eight LSTs having the same size: LST0 580, LST1 581, LST2 582, LST3 583, LST4 584, LST5 585, LST6 586, and LST7 587. The LST0 580, LST1 581, LST2 582, and LST3 583 support the T1/E1 port 2 522 for the COS0, COS1, COS2, and COS3, respectively. The LST4 584, LST5 585, LST6 586, and LST7 587 support the T1/E1 port 3 524 for the COS0, COS1, COS2, and COS3, respectively.

Figure 6:
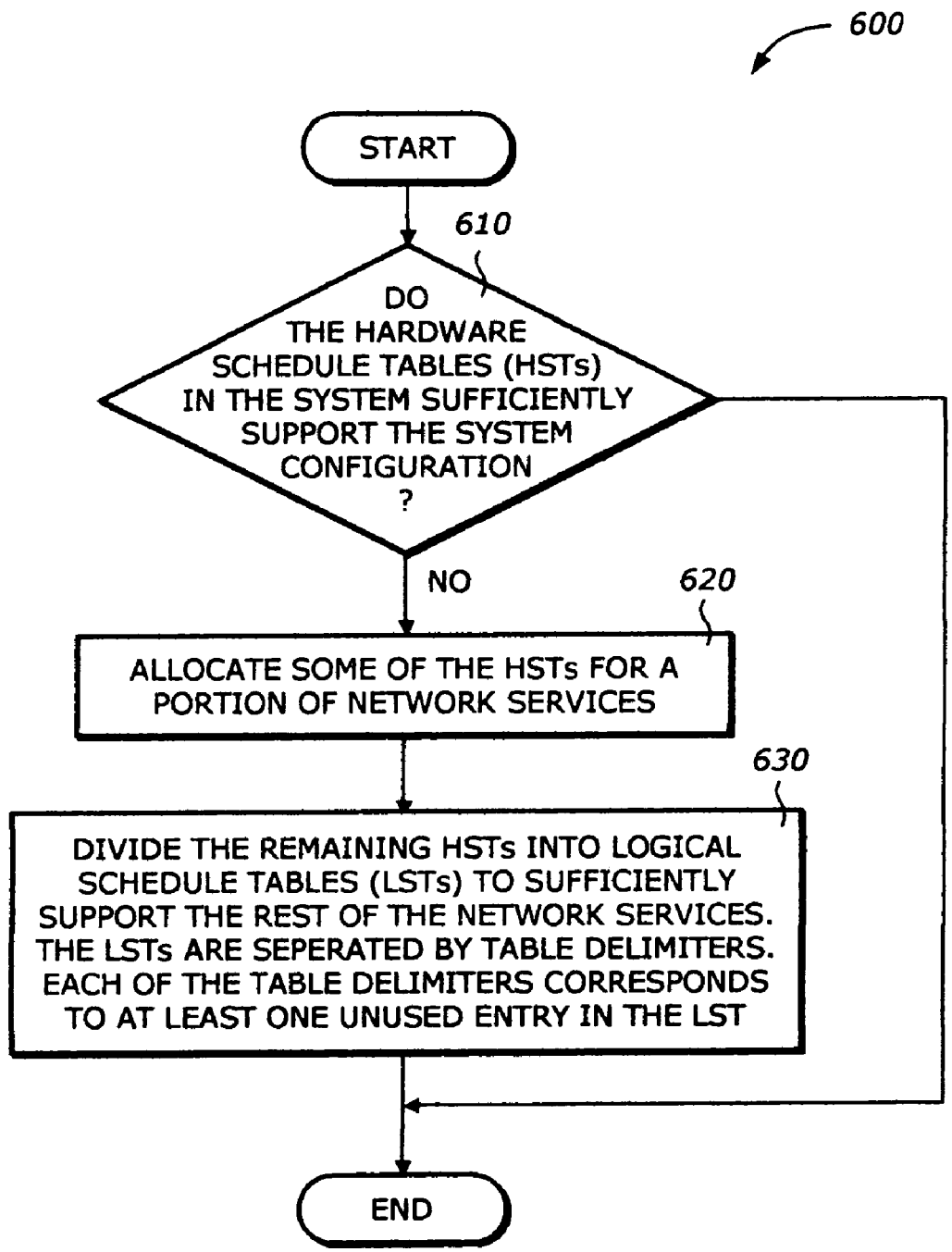
FIG. 6 shows a flowchart for a process to allocate schedule tables to a system configuration.

FIG. 6 shows a flowchart for a process 600 to allocate schedule tables to a system configuration.

Upon START, the process 600 determines if the hardware schedule tables in the scheduler can support the system configuration sufficiently (Block 610). This determination can be based on a number of system criteria, such as priorities and classes of services. If yes, the process 600 is terminated because no logical schedule tables are necessary. Otherwise, the process 600 allocates some of the HSTs for a portion of the network services (Block 620). This allocation is based on priorities in the system configuration.

Then the process 600 divides the remaining HSTs into logical schedule tables (LSTs) such that the total number of LSTs sufficiently support the remaining system configuration (Block 630). The LSTs are separated by table delimiters. Each of the table delimiters corresponds to at least one unused entry in the LSTs. Then the process 600 is terminated.

Figure 7:
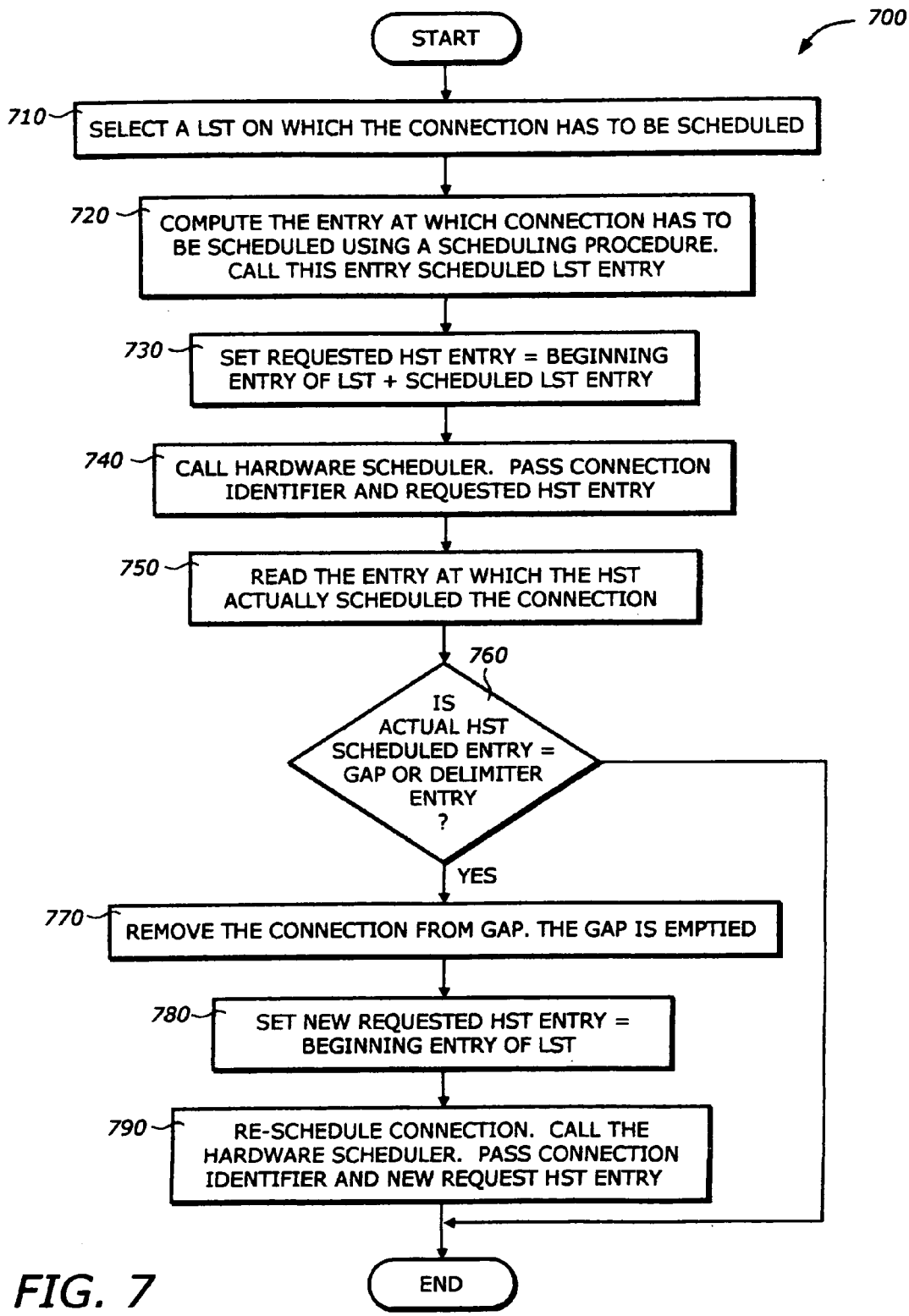
FIG. 7 shows a flowchart for a process to schedule traffic using logical schedule tables.

FIG. 7 shows a flowchart for a process 700 to schedule traffic using logical schedule tables.

Upon START the process 700 selects a LST to respond to an identifier of a connection (Block 710). The identifier is initially assigned to an entry in the selected LST. Then the process 700 determines if the initial entry for the identifier is occupied (Block 720). If not, the process 700 assigns the identifier to the initial entry (Block 730) and the process 700 proceeds to Block 765. If the initial entry is occupied, the process 700 locates the next available entry in the LST and assigns the identifier in this available entry (Block 740). Then the process 700 returns the entry number of this available entry (Block 745).

Next, the process 700 determines if this entry coincides with the delimiter of the current LST (Block 750). If not, the process 700 goes to Block 765. If the entry coincides with the delimiter of the current LST, the process 700 removes the identifier from the LST delimiter location (Block 755). The process 700 then assigns the identifier in the next available entry starting from the beginning of the current LST (Block 760).

Next, the process 700 determines if all the identifiers have been scheduled in the LSTs (Block 765). If no, the process 700 goes to the next identifier (Block 770) and goes back to Block 710. Otherwise, the process 700 is terminated.

A technique has been described to schedule traffic in a network using logical schedule tables. The technique divides a hardware schedule table into a number of logical schedule tables separated by table delimiters. An identifier corresponding to a connection request is assigned to an entry in a logical schedule table. The technique allows a hardware schedule table to support multiple physical interfaces.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to schedule connections of traffic in a network, the method comprising:
creating N logical schedule tables from a hardware schedule table having entries corresponding to connections, the N logical schedule tables being separated by table delimiters and operating independently of one another, each of the table delimiters corresponding to at least one unused entry in the hardware schedule table; and
assigning an identifier to an available entry in one of the N logical schedule tables, the identifier corresponding to one of the connections in the network.

2. The method of claim 1 wherein total size of the N logical schedule tables is equal to size of the hardware schedule table.

3. The method of claim 2 wherein each of the N logical schedule tables corresponds to a class or service.

4. The method of claim 1 wherein assigning comprises:
determining if a first entry requested by the network for the identifier is occupied; and
assigning the identifier to a second entry if the first entry is occupied, the second entry being available for occupancy.

5. The method of claim 4 wherein assigning further comprises:
assigning the identifier to the first entry if the first entry is available for occupancy.

6. The method of claim 4 wherein assigning further comprises:
assigning the identifier to a third entry if the second entry coincides with one of the table delimiters, the third entry being a next available entry found From a beginning of the one of the N logical schedule tables.

7. The method of claim 6 wherein the network is an asynchronous mode transfer (ATM) network.

8. The method of claim 7 wherein the identifier is a virtual channel identifier.

9. A computer program product comprising:
a computer usable medium having computer program code embodied therein to schedule connections of traffic in a network, the computer program product having:
computer readable program code for creating N logical schedule tables from a hardware schedule table having entries corresponding to the connections, the N logical schedule tables being separated by table delimiters and operating independently of one another, each of the table delimiters corresponding to at least one unused entry in the hardware schedule table; and computer readable program code for assigning an identifier to an available entry in one of the N logical schedule tables, the identifier corresponding to a connection in the network.

10. The computer program product of claim 9 wherein total size of the N logical schedule tables is equal to size of the hardware schedule table.

11. The computer program product of claim 10 wherein each of the N logical schedule tables corresponds to a class of service.

12. The computer program product of claim 9 wherein the computer readable program code for assigning comprises:
computer readable program code for determining if a first entry requested by the network for the identifier is occupied; and
computer readable program code for assigning the identifier to a second entry if the first entry is occupied, the second entry being available for occupancy.

13. The computer program product of claim 12 wherein the computer readable program code for assigning further comprises:
computer readable program code for assigning the identifier to the first entry if the first entry is available for occupancy.

14. The computer program product of claim 12 wherein the computer readable program code for assigning further comprising:
computer readable program code for assigning the identifier to a third entry if the second entry coincides with one of the table delimiters, the third entry being a next available entry found from a beginning of the one of the N logical schedule tables.

15. The computer program product of claim 14 wherein the network is an asynchronous mode transfer (ATM) network.

16. The computer program product of claim 15 wherein the identifier is a virtual channel identifier.

17. A system comprising:
a network interface bus;
a physical interface device coupled to the network interface bus to request a connection by an identifier; and
a network processor coupled to the network interface bus having at least a hardware schedule table to schedule connections of traffic in a network and N logical schedule tables created from the hardware schedule table, the at least hardware schedule table having entries corresponding to the connections, the N logical schedule tables being separated by table delimiters and operating independently of one another, each of the table delimiters corresponding to at least one unused entry in the hardware schedule table, the identifier being assigned to an available entry in one of the N logical schedule tables.

18. The system of claim 17 wherein total size of the N logical schedule tables is equal to size of the hardware schedule table.

19. The system of claim 18 wherein each of the N logical schedule tables corresponds to a class of service.

20. The system of claim 17 wherein the identifier is assigned to a second entry if a first entry requested by the network for the identifier is occupied, the second entry being available for occupancy.

21. The system of claim 20 wherein the identifier is assigned to the first entry if the first entry is available for occupancy.

22. The system of claim 20 wherein the identifier is assigned to a third entry if the second entry coincides with one of the table delimiters, the third entry being a next available entry found from a beginning of the scheduling table.

23. The system of claim 22 wherein the network is an asynchronous mode transfer (ATM) network.

24. The system of claim 23 wherein the identifier is a virtual channel identifier.

25. A system comprising:
a processor;
a network processor coupled to the processor, the network processor having a scheduler for scheduling connections of traffic in a network using a hardware schedule table; and
a memory coupled to the processor to store a program, the program, when executed by the processor, causing the processor to:
create N logical schedule table from the hardware schedule table, the N logical schedule table being separated by table delimiters and operating independently of one another, each of the table delimiters corresponding to at least one unused entry in the hardware schedule table, and
assign an identifier to an available entry in one of the N logical schedule tables, the identifier corresponding to one of the connections in the network.

26. The system of claim 25 wherein total size of the N logical schedule tables is equal to size of the hardware scheduler table.

27. The system of claim 26 wherein the program causing the processor to assign the identifier causes the processor to assign the identifier to a second entry if a first entry requested by the network for the identifier is occupied, the second entry being available for occupancy.

28. The system of claim 27 wherein the program causing the processor to assign the identifier causes the processor to:
assign the identifier to a third entry if the second entry coincides with one of the table delimiters, the third entry being a next available entry found from a beginning of the scheduling table.

29. The system of claim 28 wherein the network is an asynchronous transfer mode (ATM) network.

30. The system of claim 29 wherein the identifier is a virtual channel identifier.

31. The system of claim 30 wherein the network processor is a segmentation and reassembly processor.

* * * * *